(12) United States Patent
Lacaze et al.

(10) Patent No.: US 12,280,411 B2
(45) Date of Patent: Apr. 22, 2025

(54) SYSTEM AND METHOD FOR ENABLING FUSED DEPOSITION METAL 3D PRINTING

(71) Applicant: Robotic Research OpCo, LLC, Clarksburg, MD (US)

(72) Inventors: Alberto Daniel Lacaze, Potomac, MD (US); Karl Nicholas Murphy, Cocoa Beach, FL (US)

(73) Assignee: ROBOTIC RESEARCH OPCO, LLC, Clarksburg, MD (US)

( * ) Notice: Subject to any disclaimer, the term of this patent is extended or adjusted under 35 U.S.C. 154(b) by 0 days.

(21) Appl. No.: 18/200,802

(22) Filed: May 23, 2023

(65) Prior Publication Data

US 2023/0286027 A1 Sep. 14, 2023

Related U.S. Application Data

(63) Continuation of application No. 17/835,099, filed on Jun. 8, 2022, now abandoned, which is a continuation
(Continued)

(51) Int. Cl.
*B21C 29/00* (2006.01)
*B21C 23/02* (2006.01)
(Continued)

(52) U.S. Cl.
CPC ............ *B21C 29/003* (2013.01); *B21C 23/02* (2013.01); *B21C 33/02* (2013.01); *B22D 23/003* (2013.01); *B33Y 10/00* (2014.12); *B33Y 30/00* (2014.12)

(58) Field of Classification Search
CPC ....... B21C 29/003; B21C 23/02; B21C 33/02; B22D 23/003; B33Y 10/00; B33Y 30/00; Y02P 10/25
See application file for complete search history.

(56) References Cited

U.S. PATENT DOCUMENTS 9,688,025 B2 6/2017 Stava et al.
10,179,853 B2 1/2019 Naito et al.
(Continued)

FOREIGN PATENT DOCUMENTS

CN 103240882 A 8/2013
CN 103341978 A 10/2013
(Continued)

OTHER PUBLICATIONS

U.S. Appl. No. 62/268,458, filed Dec. 16, 2015 (Year: 2015).*
(Continued)

*Primary Examiner* — Rebecca Janssen
(74) *Attorney, Agent, or Firm* — RowanTree Law Group, PLLC; Frederick F. Rosenberger

(57) ABSTRACT

A metal fused deposition printer can use the thixotropic properties of a metal (e.g., alloy) to control the viscosity of the material being deposited. The viscosity of the metal can be controlled by shearing the metal before, during, or after the deposition process. Use of the thixotropic properties can allow the viscosity of the metal to be controlled independent of the temperature of the metal. This can allow for more precise control of the temperature differential between the layer being deposited and the substrate layer, for example, such that the temperatures are substantially the same.

18 Claims, 1 Drawing Sheet

Related U.S. Application Data of application No. 15/928,794, filed on Mar. 22, 2018, now Pat. No. 11,383,282.

(60) Provisional application No. 62/475,567, filed on Mar. 23, 2017.

(51) Int. Cl.
    *B21C 33/02* (2006.01)
    *B22D 23/00* (2006.01)
    *B33Y 10/00* (2015.01)
    *B33Y 30/00* (2015.01)

(56) References Cited

U.S. PATENT DOCUMENTS

| | | |
|---|---|---|
| 2015/0125334 A1 | 5/2015 | Uetani et al. |
| 2015/0197060 A1 | 7/2015 | Carr et al. |
| 2017/0252812 A1 | 9/2017 | Mykulowycz et al. |
| 2017/0252820 A1* | 9/2017 | Myerberg ............... B22F 12/10 |

FOREIGN PATENT DOCUMENTS

| | | | |
|---|---|---|---|
| CN | 203418763 U | 2/2014 | |
| CN | 103619565 A | 3/2014 | |
| CN | 103878270 A | 6/2014 | |
| CN | 104624692 A * | 5/2015 | ............. B21C 23/02 |
| CN | 205629377 U | 10/2016 | |
| JP | 2016-501136 A | 1/2016 | |
| KR | 20170021839 A | 2/2017 | |
| WO | 2016/041449 A1 | 3/2016 | |

OTHER PUBLICATIONS

Notice of Allowance, issued Mar. 22, 2022 (Mar. 17, 2022) in U.S. Appl. No. 15/928,794. (7 pages).
Office Action, issued May 15, 2019 (May 15, 2019), in U.S. Appl. No. 15/928,794. (19 pages).
Office Action, issued Sep. 26, 2019 (Sep. 26, 2019), in U.S. Appl. No. 15/928,794. (24 pages).
Office Action, issued Mar. 20, 2020 (Mar. 20, 2020), in U.S. Appl. No. 15/928,794. (23 pages).
Office Action, issued Oct. 16, 2020 (Oct. 16, 2020), in U.S. Appl. No. 15/928,794. (16 pages).
Office Action, issued Jun. 17, 2021 (Jun. 17, 2021) in U.S. Appl. No. 15/928,794. (17 pages).
Office Action, issued Dec. 6, 2021 (Dec. 6, 2021) in U.S. Appl. No. 15/928,794. (17 pages).
Office Action, issued Oct. 25, 2022 (Oct. 25, 2022), in U.S. Appl. No. 17/835,099. (9 pages).
Office Action, issued Jan. 25, 2023 (Jan. 25, 2023), in U.S. Appl. No. 17/835,099. (16 pages).
Wight, M.J., "Design of a Nozzle for Semi-Solid Metal Printing," Worcester Polytechnic Institute, 2015. (619 pages).

* cited by examiner

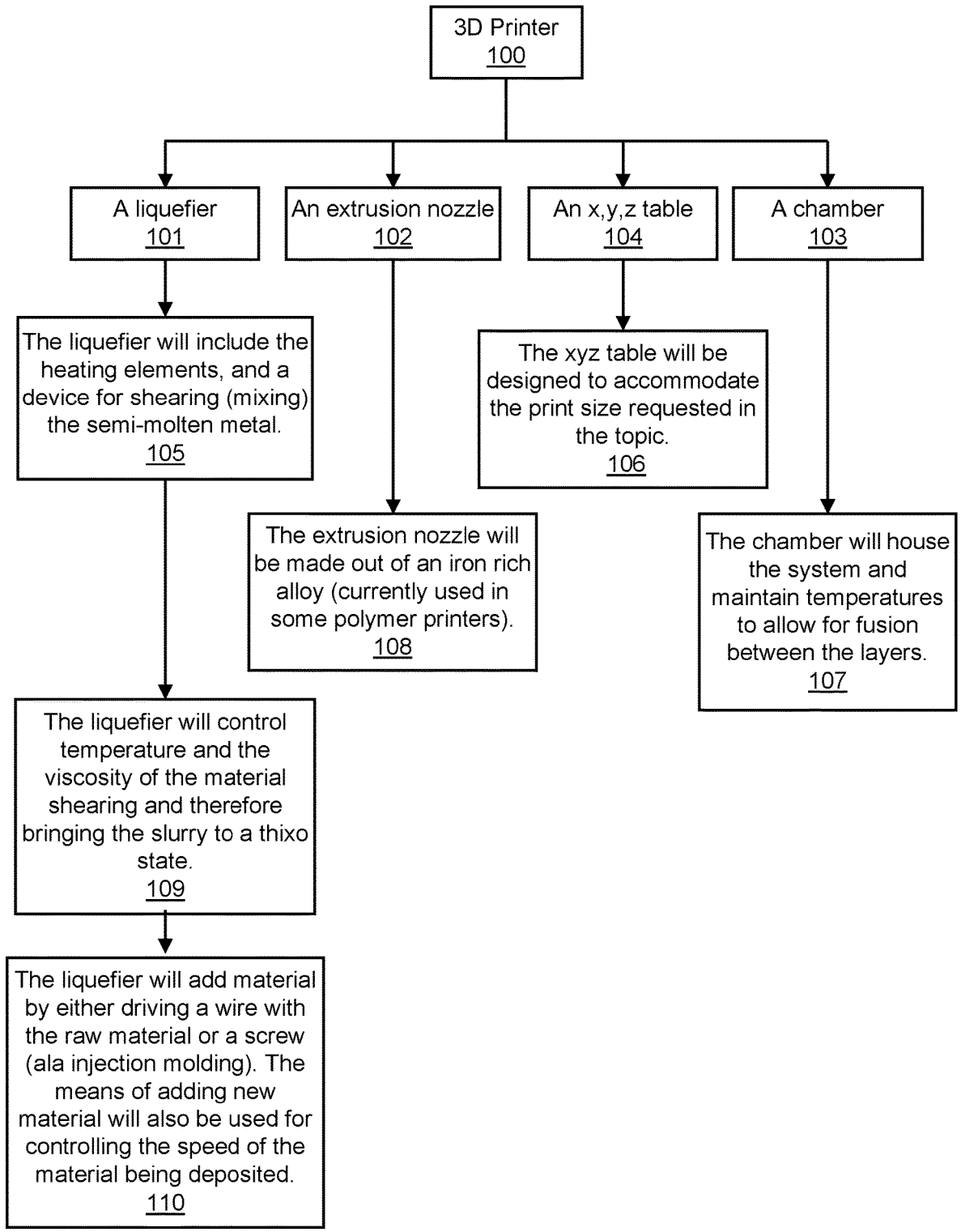

SYSTEM AND METHOD FOR ENABLING FUSED DEPOSITION METAL 3D PRINTING

CROSS-REFERENCE TO RELATED APPLICATION(S)

This application is a continuation of U.S. application Ser. No. 17/835,099, filed Jun. 8, 2022, which is a continuation of U.S. application Ser. No. 15/928,794, filed Mar. 22, 2018, now U.S. Pat. No. 11,383,282, which claims benefit of and priority under 35 U.S.C. § 119(e) to and is a non-provisional of U.S. Provisional Application No. 62/475,567, filed Mar. 23, 2017, each of which are hereby incorporated by reference herein in its entirety.

FIELD

The present invention relates generally to rapid prototyping using 3D printers. More specifically, the present invention relates to rapid prototyping using 3D printers where a fused deposition 3D printer takes advantage on the advancement in polymer based additive manufacturing techniques.

BACKGROUND

Polymer based fused deposition printers have undergone a decade of technical improvements and printers are currently inexpensive and reliable. This transformation is still to be accomplished in the metal 3D printing arena. The technologies available have downfalls including print size, print time, quality of resulting parts, and overall process.

Many parts being printed today have to undergo an annealing process that is not naturally conducive to specific military requirements. The advantage of the approach of the present invention is that it is more amenable to creating systems that are low cost and that bypass many of the current challenges: toxic powders, heat treatments, or annealing.

Polymer based fused deposition printers have undergone a decade of technical improvements and printers are currently inexpensive and reliable. This same transformation is still to be accomplished in the metal 3D printing arena. The few technologies available have several downfalls including print size, print time, quality of the resulting parts, and overall process. For example, many parts being printed today have to undergo an annealing process that takes time, and it is not naturally conducive to Department of Defense (DoD). Also, the raw materials used often include very fine metallic powders that are very toxic or can become explosive under some circumstances.

Although the process of metal 3D printing is currently somewhat cumbersome, being able to print metallic parts in-situ will provide significant advantages from a logistics standpoint and therefore affect maintainability and on-time readiness in a way that could be revolutionary to the DoD.

SUMMARY

As mentioned in the topic, there are some technologies like powder beds that could be somewhat improved to make the process more appealing to the DoD requirements. There are significant efforts currently underway with the Oak Ridge National Labs and Kansas City Plant that are already addressing these incremental improvements.

The present invention is a revolutionary new process that uses the thixotropic properties of some metals and alloys to create a fused deposition 3D printer that takes advantage of the advancement in polymer based additive manufacturing techniques. The advantage of the proposed approach is that is more amenable to creating systems that are low cost, easier to deploy, and bypass many of the current challenges: toxic powders, need for heat treatments, or annealing.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The FIGURE is a flow chart of the method taught by the present invention.

DETAILED DESCRIPTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

The present invention is a revolutionary new process that uses the thixotropic properties of some metals and alloys to create a fused deposition 3D printer that takes advantage on the advancement in polymer based additive manufacturing techniques. The advantage of the proposed approach is that is it more amenable to creating systems that are low cost, easier to deploy, and bypass many of the current challenges: toxic powders, need for heat treatments, or annealing.

Thixotropy is a time-dependent shear thinning material property exhibited by some metals and alloys. Under certain conditions these metals are thick (viscous) but will flow (become thin, less viscous) over time when shaken, agitated, sheared or otherwise stressed even if the temperature is not increased. In other words, thixotropic materials can change viscosity either by changing their temperature or by shaking/shearing them. This is very advantageous because it can allow for the independently control (from viscosity) of the temperature and heat transfer characteristics between the newly deposited layer and the previous layer in a 3D printer. Not all metals are thixotropic in their raw state; for example, aluminum transforms from solid to liquid having only a very small area where it exhibits these properties.

Viscosity is a core characteristic utilized by fused deposition 3D printers. As the polymer exits the tip, it is hot and it easily flows out of the tip, but its viscosity quickly changes as it adheres to the previous layer. The heat transfer is controlled using the substrate and chamber temperature to provide a good bonding/fusion between layers. The same viscous properties are important in many manufacturing processes.

For example, although Aluminum alloys are often die casted, they are seldom injection molded. One of the reasons is that as the molten aluminum is injected, it either solidifies too quickly and causes voids in the part or runs too fast creating bubbles as it cools. Maintaining a constant speed and propagation of the material in the mold becomes significantly more cumbersome with materials that do not exhibit some level of viscosity.

In the past few years, the thyrotrophic properties of some alloys have been exploited to improve the metal injection molding process (dubbed Thixomolding because of the thixotropic properties). It is likely that the reviewer of this application has a smart phone in his/her pocket whose case was built using Magnesium Thixomolding.

One more important property is that metals that have significant Thixotropic areas do not often create internal stresses that need to be heat treated or annealed, saving a slow, costly, and energy intensive step in the manufacturing process.

The same thixotropic properties that have revolutionized metal injection molding can be used to create a metal fused deposition 3D printer that uses the Thixotropic zone to overcome many of previous attempts at the technology.

Magnesium alloy AZ91D is a good candidate because it is the alloy most commonly used for thixomolding. For example, the Samsung Galaxy 7 phones casing is built using a Magnesium alloy. These alloys are lighter than aluminum with very similar mechanical properties. The corrosion and oxidation characteristics are also similar to aluminum from a durability standpoint. The metal being used can be doped with other materials (e.g., attapulgite), which enhance or modify the thixotropic region.
These alloys also provide significant RF/EMI shielding and better than aluminum heat conductivity.

The proposed fused deposition 3D printer system 100 will be composed of four main components: a liquefier 101, extrusion nozzle 102, a chamber 103, and an x,y,z table 104.

The liquefier will include the heating elements, and a device for shearing (mixing) the semi-molten metal 105. The shearing of material (to control viscosity) can occur before it exits the nozzle or the extruder. For example, the shearing can be performed by a mixing stage; in this stage, the metal is sheared by rotating arms, or by forcing the metal through tight openings. Alternatively, the shearing can be performed by shaking the metal inside the liquefier, or in a stage directly before the nozzle or extruder.

The liquefier will control temperature and the viscosity of the material shearing and therefore bringing the slurry to a thixo state 109. The liquefier will add material by either driving a wire with the raw material or a screw (ala injection molding). The means of adding new material will also be used for controlling the speed of the material being deposited 110.

The extrusion nozzle will be made out of an iron rich alloy (currently used in some polymer printers). Magnesium is strongly repelled by iron, providing for cleaner process 108.

The xyz table will be designed to accommodate the print size requested in the topic 106. Because AZ91D has very little shrinkage, the inventors expect that large prints will be possible without the usual complications associated with metal printing and shrinkage.

Finally, the chamber will house the system and maintain temperatures to allow for fusion between the layers 107.

Although AZ91D oxidizes, it is less prone to fast oxidation like AL, therefore, the inventors expect that the inventors will get away without having have a fully air tight chamber as required by other processes, however, some inert gas may be necessary to delay surface oxidation and for good bonding.

Metal fused deposition is the holy grail of metal 3D printing, the inventors are proposing in this research to extend the advances made in Thixomolding into the 3D printing arena. The inventors are already building 3D printers to provide sterile polymer printing to warfighters, and therefore uniquely placed to do this research.

The major tasks include: designing a liquefier that can melt the alloy and control the thixo properties of the slurry to create the sufficient amount of viscosity to allow flow and provide good bonding. The x,y,z and nozzles table can be leveraged from other ongoing programs, and the chamber will need to be designed to meet the temperature and gas requirements.

The benefits could be revolutionary. The inventors are proposing a low cost, low energy requirements metal printer that can be deployed, and more importantly can print parts in single steps that need little post processing.

Thixomolding is currently used as a manufacturing process for many devices including airplane, and automotive markets. Polymer deposition is commercially available and low cost. The combination of the two technologies has not been previously researched.

The inventors see two main risks: stable repeatable bonds between layers and surface oxidation during printing process. As explained earlier, being able to control the thixo properties of the slurry (e.g., by shaking the deposited part in order to control the viscosity of the deposited layer) will allow us to change the temperatures of the substrate and the bead (e.g., where the extruded material is the same temperature as the substrate, but the viscosity of the extruded material is controlled through shearing), and therefore, controlling the heat transfer and temperature of the bond becomes easier. Surface oxidation can be solved by closing the chambers.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A method comprising:
   forming, via a liquefier, a metal into a slurry, the liquefier comprising a heating element and a shearing device, the forming comprising controlling the heating element and the shearing device to cause the metal to have a first temperature and to achieve a viscosity within a thixotropic range of the metal; and
   depositing, via an extrusion nozzle in communication with the liquefier, the formed slurry onto a substrate, the substrate being at a second temperature during the depositing,
   wherein the first temperature is substantially the same as the second temperature.

2. The method of claim 1, further comprising:
   moving the extrusion nozzle as the slurry is deposited onto the substrate.

3. The method of claim 2, wherein:
   the extrusion nozzle and the substrate are disposed within a printing chamber, and
   the method further comprises controlling a temperature of the printing chamber.

4. The method of claim 1, further comprising:
   after the slurry is deposited onto the substrate, shaking so as to control a viscosity of the deposited slurry.

5. The method of claim 1, wherein the liquefier comprises a screw that feeds chips of the metal, powder of the metal, or both chips and powder of the metal to the heating element.

6. The method of claim 1, wherein the controlling the shearing device causes the metal to achieve the viscosity within the thixotropic range before the slurry is deposited from the extrusion nozzle.

7. The method of claim 6, wherein the controlling the shearing device to achieve the viscosity within the thixotropic range comprises (i) using one or more rotating arms, or (ii) forcing the metal through a narrow opening.

8. A method comprising:
   forming, via a liquefier, a metal into a slurry, the liquefier comprising a heating element and a shearing device, the forming comprising controlling the heating element and the shearing device to cause the metal to have a first temperature and to achieve a viscosity within a thixotropic range of the metal; and
   depositing, via an extrusion nozzle in communication with the liquefier, the formed slurry onto a substrate, the substrate being at a second temperature during the depositing,
   wherein the first temperature is substantially the same as the second temperature,
   the controlling the shearing device causes the metal to achieve the viscosity within the thixotropic range before the slurry is deposited from the extrusion nozzle, and
   the controlling the shearing device to achieve the viscosity within the thixotropic range comprises shaking the metal within the liquefier.

9. The method of claim 1, wherein the depositing comprises using a drive wire, a drive screw, or both a drive wire and a drive screw to control a speed at which the slurry is deposited onto the substrate.

10. The method of claim 1, wherein the metal in the slurry comprises a magnesium alloy.

11. The method of claim 10, wherein the magnesium alloy comprises an AZ91D alloy.

12. The method of claim 1, wherein the metal in the slurry comprises a metal doped with attapulgite.

13. A method comprising:
   forming, via a liquefier, a metal into a slurry, the liquefier comprising a heating element and a shearing device, the forming comprising controlling the heating element and the shearing device to cause the metal to have a first temperature and to achieve a viscosity within a thixotropic range of the metal;
   depositing, via an extrusion nozzle in communication with the liquefier, the formed slurry onto a substrate, the substrate being at a second temperature during the depositing; and
   shaking a part formed on the substrate by the slurry deposited from the extrusion nozzle, so as to control a viscosity of said part,
   wherein the first temperature is substantially the same as the second temperature.

14. The method of claim 1, wherein the controlling the shearing device to achieve the viscosity within the thixotropic range comprises shaking, via the shearing device, the metal upstream from the extrusion nozzle.

15. The method of claim 13, wherein the metal in the slurry comprises a magnesium alloy.

16. The method of claim 13, wherein the metal in the slurry comprises a metal doped with attapulgite.

17. The method of claim 8, wherein the metal in the slurry comprises a magnesium alloy.

18. The method of claim 8, wherein the metal in the slurry comprises a metal doped with attapulgite.

* * * * *